W. DENNIS.
FRICTION CLUTCH.
APPLICATION FILED MAY 15, 1911.
1,027,377.
Patented May 21, 1912.
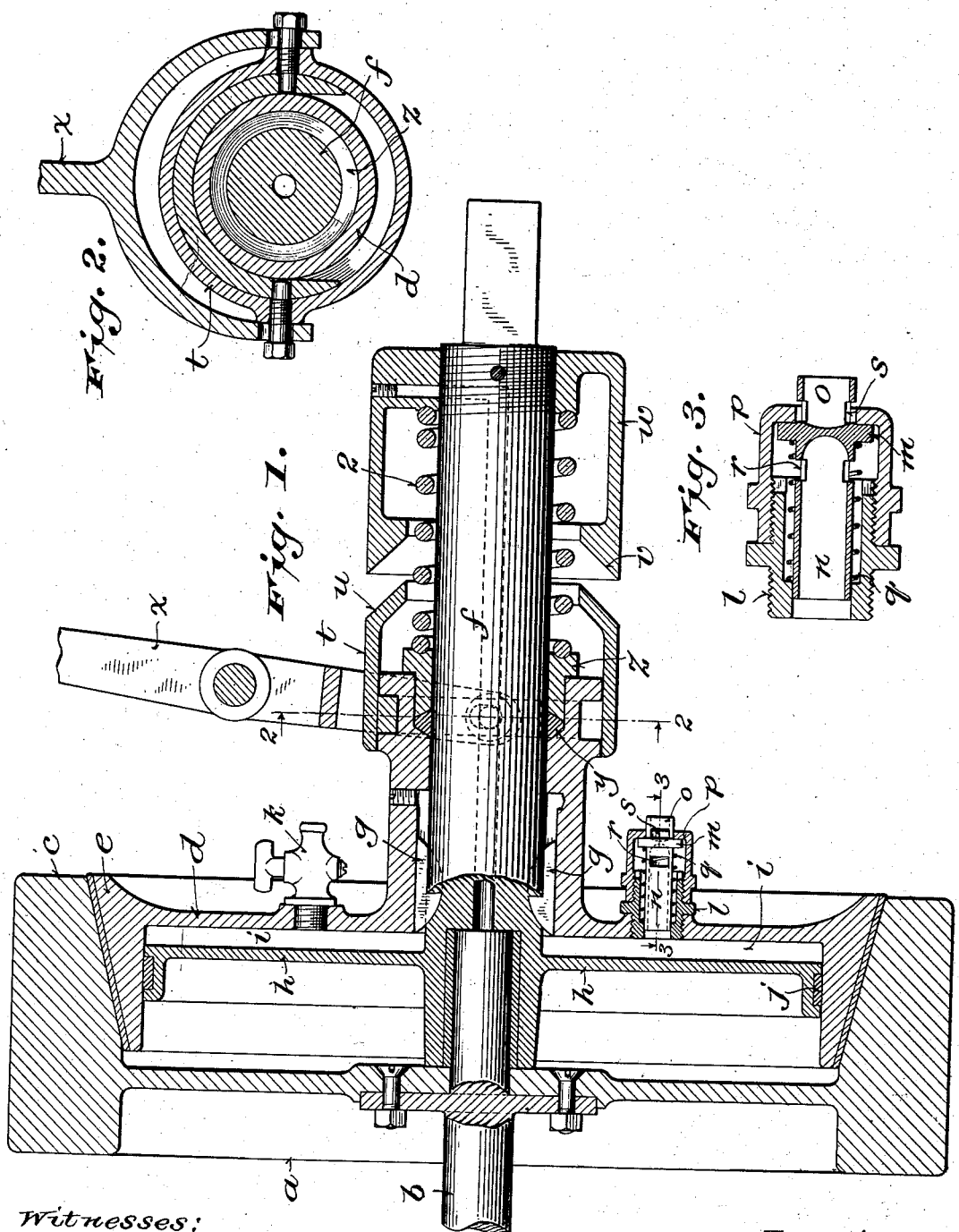
Witnesses:
Fred Palm
Alice E. Goss
Inventor:
William Dennis,
By Flanders Bottum Fawsett Bottum
Attorneys.

UNITED STATES PATENT OFFICE.

WILLIAM DENNIS, OF MILWAUKEE, WISCONSIN, ASSIGNOR, BY MESNE ASSIGNMENTS, TO VERGES MANUFACTURING CO., OF MILWAUKEE, WISCONSIN, A CORPORATION OF WISCONSIN.

FRICTION-CLUTCH.

1,027,377.

Specification of Letters Patent. Patented May 21, 1912.

Application filed May 15, 1911. Serial No. 627,179. REISSUED

*To all whom it may concern:*

Be it known that I, WILLIAM DENNIS, a citizen of the United States, residing at Milwaukee, in the county of Milwaukee and State of Wisconsin, have invented certain new and useful Improvements in Friction-Clutches, of which the following is a specification, reference being had to the accompanying drawing, forming a part thereof.
The main objects of this invention are to prevent the shock incident to suddenly engaging the members of friction clutches, to stop rotation of the driven members by the operation of shifting them out of engagement with the driving members, and generally to simplify and improve the construction and operation of clutches of this class.

It consists in the construction, arrangement and combination of parts, as hereinafter particularly described and defined in the claims.

In the accompanying drawing like characters designate the same parts in the several figures.
Figure 1 is an axial section of a clutch embodying the invention; Fig. 2 is a cross section on the line 2 2, Fig. 1; and Fig. 3 is an enlarged axial section on the line 3 3, Fig. 1, of the automatic air inlet valve.
For the purpose of illustration the invention is shown as embodied in a clutch specially designed for use in motor vehicles, but it may be embodied in other forms for various uses within the scope of the invention.
Referring to the drawing, and particularly to Fig. 1, $a$ designates the driving member of the clutch, which in the present case may represent the flywheel of the engine. It is fixed on a shaft $b$ and is provided with a rim $c$ having an overhanging or internal conical friction face. The driven member $d$ of the clutch, which has a conical rim $e$ fitting into the conical rim of the driving member $a$, is mounted and movable axially upon a shaft $f$, with which it is caused to rotate by keys $g$, inserted in opposite sides of said shaft and working in horizontal grooves in the hub of member $d$.

Within the overhanging rim $e$ of the member $d$ is movably fitted a disk or retarding member $h$ which forms therewith an air chamber $i$, the rim of said disk being provided with suitable packing $j$ to prevent leakage between it and the rim $e$. The disk $h$ is formed with or fixed on the driving shaft $f$, which projects therefrom toward the driving member $a$, and is centrally bored to form a bearing for the adjacent end of the driving shaft $b$, whereby the clutch members are held with the shafts $b$ and $f$ in proper alinement.

A cock $k$ screwed into an opening in the web of member $d$, affords an adjustable air vent or outlet for the chamber $i$, and an automatic air inlet valve screwed into another opening in the web of said member $d$, allows air to enter said chamber whenever the friction member $d$ of the clutch is shifted away from the relatively fixed retarding member $h$. This valve, as shown in detail in Fig. 2, comprises an externally threaded flanged case or sleeve $l$, which is screwed into the inlet opening in the web of member $d$, as shown in Fig. 1, a valve head or disk $m$, provided on the inner side with a tubular stem $n$ and on the outer side with a tubular stem $o$, and a centrally perforated cap $p$ threaded on the outer end of the case or sleeve $l$. The stem $n$, which is open at its inner end, is fitted and guided in the contracted bore at the inner end of the case or sleeve $l$, and the stem $o$ is fitted and guided in the central opening in the cap $p$, against which the valve disk or head $m$ is fitted and closes outwardly around the central opening therein.

A spring $q$, surrounding the stem $n$ and bearing at its inner end against an internal shoulder in the case or sleeve $l$ and at its outer end against the valve disk or head $m$, tends to move said disk or head toward its seat. The tubular stem $n$ is formed adjacent to the disk or head with lateral ports $r$, and the stem $o$ is formed with lateral ports $s$, through which air entering the outer end of the stem $o$ passes outwardly around the periphery of the disk or head $m$ when the latter is unseated, into the stem $n$ and thence into the expanding chamber $i$.

A nonrotating shifting collar or member $t$, engaging with an external annular groove in the hub of member $d$, is formed at its outer end with a conical friction face $u$, which fits into the correspondingly shaped conical end $v$ of a sleeve or collar $w$ which is fixed on the shaft $f$. The collars $t$ and $w$ are thus made to serve as friction brake members to stop the rotation of the driven member of the clutch when it is thrown out of engagement with the driving member. A lever $x$ or other means for throwing the clutch out of action, is connected with the collar t, while the shaft f with the retarding disk or member h fixed thereon, and the shaft b with the driving member a, are held against endwise movement by suitable bearings (not shown).

The outer end of the hub of member d is formed with a stuffing box and provided with packing y compressed therein by a gland z to prevent escape of air from the chamber i around the shaft f.

A spiral spring 2 surrounding the shaft f and bearing at one end against the recessed sleeve or collar w and at the other end against the gland z, tends to force the driven member d into engagement with the driving member a.

In the operation of the clutch, when the shifting collar t is released, the spring 2 forces the driven member d toward and into engagement with the driving member a, the axial movement of the member d on the shaft f being checked or retarded by the air confined in the chamber i and escaping therefrom through the vent valve k more or less slowly according to the adjustment of said valve. The driven member d being thus brought gradually into frictional engagement with the rotating driving member a, starts to rotate slowly and smoothly, thereby avoiding shock and excessive strain upon the clutch members and the mechanism connected therewith, the driven member gradually but quickly acquiring the speed of the driving member. When the shifting member t is withdrawn by the lever x or other operating connection against the tension of the spring 2, the inlet valve m is opened against the tension of the light spring q, admitting air into the chamber i and permitting the member d to move freely away from the member h, until the friction face u of the shifting member t engages the face v of the sleeve or collar w, whereupon further movement of the member d away from the member h is arrested, the valve m is instantly closed by the spring q and the rotary movement of the members d and h and shaft f is arrested by the frictional engagement of the collar or shifting member t with the sleeve or collar w.

Any tendency of the air in chamber i to escape through the inlet valve, reacting against the closed end of the tubular stem n operates to instantly and tightly close said valve, the peculiar construction of which renders its operation prompt and certain, the spring q being provided as a safeguard in case the valve should stick.
I claim:

1. In a friction clutch the combination of two friction members one movable axially relatively to the other, an axially fixed member forming with the movable friction member a closed air chamber, which is provided with a restricted vent and with an outwardly closing inlet valve, and means for forcing the movable friction member into engagement with the other friction member.

2. In a friction clutch the combination of two friction members one of which is movable axially into and out of engagement with the other, an axially fixed member forming with the axially movable friction member an expansible air chamber having an adjustable vent and an outwardly closing inlet valve, and means for forcing the movable friction member into engagement with the other friction member.

3. In a friction clutch the combination of two friction members one of which is movable axially into and out of engagement with the other, a retarding member rotatable with said movable friction member and forming therewith a closed expansion chamber which is provided with an automatic air inlet valve and with a restricted air vent, and means for shifting said movable friction member axially with relation to the other friction member.

4. In a friction clutch the combination of rotary friction members one of which is movable axially into and out of engagement with the other, a retarding member interposed between said friction members and forming with the movable friction member an expansible air chamber having an automatic inlet valve and a restricted air vent, and means for shifting said movable friction member axially with relation to the other friction member.

5. In a friction clutch the combination of friction members one of which is movable axially into and out of engagement with the other, a spring tending to shift said movable member into engagement with the other, means for shifting said movable member in the opposite direction, and a retarding member forming with the movable friction member a closed air chamber having a restricted vent and an automatic inlet valve.

6. In a friction clutch the combination of friction members one of which is movable axially into and out of engagement with the other, means for shifting said movable member axially, a retarding member forming with said movable friction member an air chamber which has an air inlet and a restricted vent opening, and an inwardly opening valve seated in said air inlet and having a tubular stem open at its inner end in communication with said chamber and a lateral opening adjacent to the valve.

7. In a friction clutch the combination of friction members one of which is movable into and out of engagement with the other, a retarding member rotatable with said movable friction member which is movable axially with relation thereto and forms therewith an air chamber having a restricted vent and an automatic inwardly opening inlet valve, and means for shifting said movable friction member axially with relation to the other friction member and said retarding member.

8. In a friction clutch the combination of friction members one of which is movable axially into and out of engagement with the other, a retarding member having a central rotary bearing connection with the relatively fixed friction member and forming with the movable friction member an air chamber which has an air vent and an automatic air inlet valve, and means for shifting the movable friction member axially relative to the other friction member and to said retarding member.

In witness whereof I hereto affix my signature in presence of two witnesses.

WILLIAM DENNIS.

Witnesses:
 CHAS. L. GOSS,
 FRED PALM.